United States Patent Office 3,734,691
Patented May 22, 1973

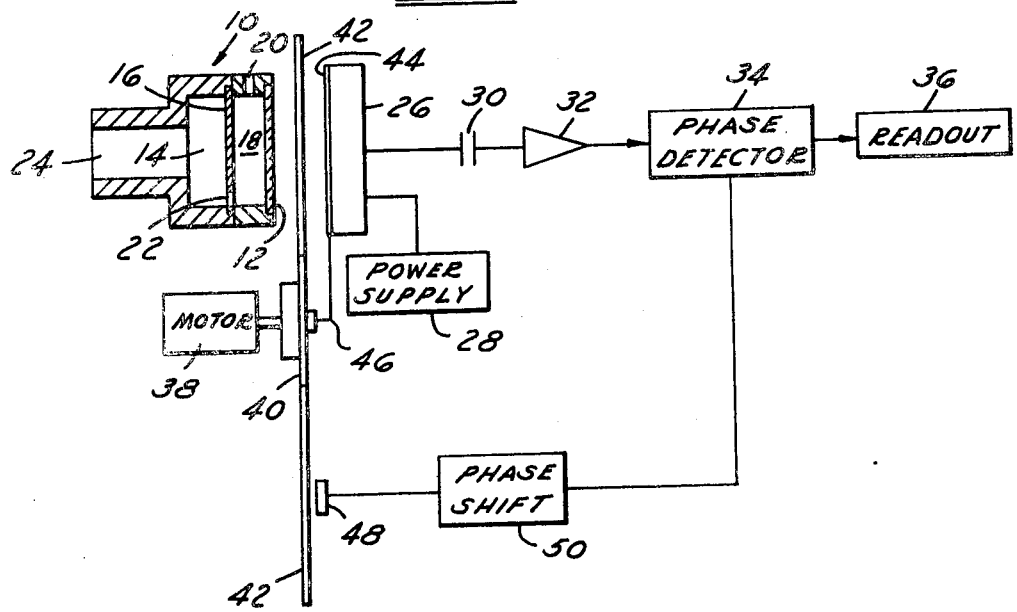
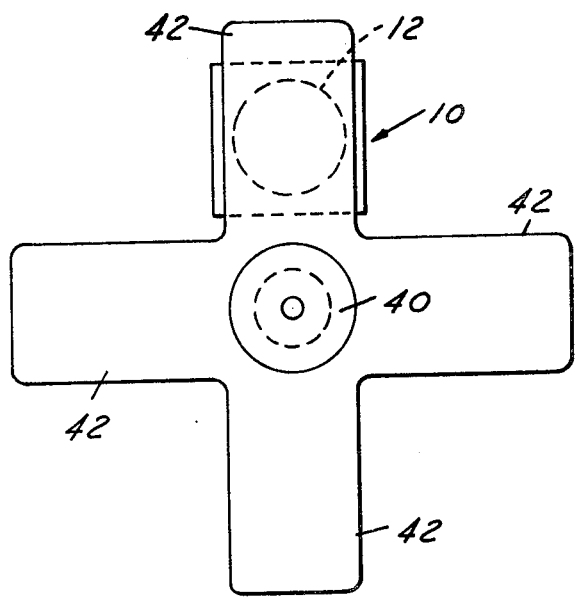

3,734,691
SENSING SYSTEM FOR A CHEMILUMINESCENT INSTRUMENT
Cassimer M. Kukla, Taylor, and Alan Warnick, Oak Park, Mich., assignors to Ford Motor Company, Dearborn, Mich.
Filed Sept. 15, 1971, Ser. No. 180,599
Int. Cl. G01n 21/52; G01j 1/54, 1/34
U.S. Cl. 23—253 R    7 Claims

ABSTRACT OF THE DISCLOSURE

An opaque blade is rotated between the light transmitting element of a chemiluminescent reaction chamber and a light sensing device. The blade is sufficiently wide to block momentarily all light transmission from the reaction chamber to the light sensing device. An alternating electrical signal thus is obtained directly from the light sensing device. A transparent electrically conductive coating applied to the face of the light sensing device is grounded electrically to the blade to prevent spurious electrical signals.

SUMMARY OF THE INVENTION

This invention relates to the subject matter of U.S. patent applications Colvin et al. S.N. 146,927 entitled "Chemiluminescent Instrument," Warnick et al. S.N. 146,929 entitled "Chemiluminescent Process" both field on May 26, 1971, and concurrently filed Warnick et al. S.N. 180,823 entitled "Chemiluminescence Reaction Chamber."

A photomultiplier tube typically has been used to measure the chemiluminescence emitted by the reaction of nitric oxide with ozone in an analytical instrument. The high sensitivity of a photomultiplier tube is offset to a considerable extent by its fragile nature, its relatively large size and the need for a high voltage supply.

This invention provides a system for sensing the chemiluminescence of a reaction taking place in a reaction chamber that reduces considerably both initial and operating costs of a chemiluminescence instrument. In the system, a light sensing device is spaced a short distance away from the exterior surface of the light transmitting element defining at least a portion of the chemiluminescent reaction chamber. An opaque blade is moved periodically through the space existing between the light sensing device and the light transmitting element. The blade interrupts periodically the chemiluminescence reaching the light sensing device and thus produces a periodic electrical signal having the characteristics of an alternating electrical signal. An electronic amplification circuit applies the alternating electrical signal to a readout device.

Periodic interruption of the light reaching the light sensing device can be provided by rotating a plurality of fan type blades through the space between the light transmitting element and the light sensing device. A small electric motor drives the blades, each of which preferably has a width sufficient to block all light from reaching the light sensing device as the blade moves through the space. The length of time during which light transmission is blocked completely preferably is selected in conjunction with the response characteristics of the light sensing device to ensure that the electrical output of the light sensing device declines substantially to zero. A phase detector synchronized with the blades can be included in the electronics to eliminate the effects of spurious noise.

An electrically conductive coating transparent to the chemiluminescence preferably is applied to the surface of the light sensing device that faces the blades and is grounded electrically to the blades. The coating electrically isolates the light sensing device from the blades and eliminates capacitive effects of the moving blades on the highly sensitive surface of the light sensing device. A transparent, conductive member located between the blades and the light sensing device can be substituted for the coating if desired.

BRIEF DESCRIPTION OF THE DRAWINGS

FIG. 1 is a schematic illustration of a chemiluminescent instrument containing the system of this invention. The figure illustrates the relationship of the chemiluminescent reaction chamber, a solid state light sensing device spaced a short distance from the reaction chamber and having a transparent, electrically conductive coating on its surface, and a plurality of fan type blades rotating through the space between the reaction chamber and the light sensing device. FIG. 2 is a plan view showing the relationship of the fan type blades to the light transmitting element of the reaction chamber.

DETAILED DESCRIPTION

Referring to the drawings, a reaction chamber for a chemiluminescent instrument comprises a housing 10 having a light transmitting element 12 defining one side of a chamber 14. A baffle 16 extends through chamber 14 in a plane substantially parallel to and slightly inside of light transmitting element 12. Baffle 16 cooperates with light transmitting element 12 to define a relatively narrow reaction space 18. Openings in the wall of housing 10, one of which is represented by numeral 20, admit a sample mixture and a reactant mixture into reaction space 18. A segment shaped opening 22 in baffle 16 is located diametrically across reaction space 18 from opening 20 and an exhaust passage 24 extends into the rear surface of housing 10 to communicate with chamber 14 behind baffle 16.

A silicon photodiode 26 that serves as the light sensing device is spaced a short distance away from the exterior surface of light transmitting element 12. Useful light sensing devices include other photocells capable of detecting light in the infrared or near infrared portion of the spectrum (approximately 6,400–25,000 angstrom units).

An electrical power supply 28 is connected to silicon photodiode 26 and the output of the photodiode is connected through a capacitor 30 to an amplifier 32. Amplifier 32 has its output connected to a phase detector 34 and the output of phase detector 34 is applied to a readout device 36. A position sensor 48 located adjacent the plane of rotation of blades 42 and 180 rotational degrees from the light sensor is connected through a phase shifting circuit 50 to phase detector 34.

A small electric motor 38 is mounted in the chemiluminescent instrument adjacent the reaction chamber housing 10. Motor 38 rotates a blade assembly 40 consisting of four equally spaced flat blades 42 (see FIG. 2). Each of blades 42 is relatively wide as indicated in FIG. 2 and each blade is opaque to the chemiluminescence produced in the reaction chamber housing 10 during instrument operation. Motor 38 is mounted so that the blades rotate through the space separating light sensing device 26 from the exterior of light transmitting element 12.

An electrically conductive coating 44 transparent to the chemiluminescence is applied to the surface of light sensing device 26. Typical materials useful as coating 44 include tin oxide and other conductive or semi-conductive compounds capable of sufficiently thin application to be transparent. A lead 46 electrically connects coating 44 to blade assembly 40.

In a typical installation, motor 38 rotates blade assembly 40 at about 7500 r.p.m. Blades 42 are made of aluminum about 1/32 inch thick and rotate through a 1/16 inch space existing between element 12 and coating 44. The blades are one inch wide, which equals the diameter of the active portion of light transmitting element 12. Blade rotation produces equal periods of light transmission and blockage so that the light sensing device produces substantially a sine wave. Detector 34 synchronously detects the sine wave signal and applies a representative signal to readout device 36. Blade rotational speed and the other parameters of the blades can be modified considerably. For example, increasing the spacing between the blades at the radius of the light transmitting device produces a waveform approximating a square wave. The sides of the blades facing the light sensing device preferably are painted black to avoid reflectance.

Thus this invention provides a sensing system for improving the sensitivity and accuracy of a chemiluminescent instrument while decreasing its equipment and operating costs.

I claim:

1. In an instrument for measuring the chemiluminescence of a reaction taking place in a reaction chamber, a system for producing an electrical signal representing the chemiluminescence comprising
    a light transmitting element for transmitting the chemiluminescence produced in the reaction,
    a light sensing means for receiving the light transmitted through the light transmitting element and producing an electrical signal representative of the amount of light received,
    mechanical means moving between the light transmitting element and the light sensing means for interrupting periodically the light reaching the light sensing means, said light sensing means thus producing a periodically interrupted electrical signal having the characteristics of an alternating signal,
    an electrically conductive, transparent coating on the surface of said light sensing means that faces said light transmitting element, said coating being connected electrically to said mechanical means, and
    means for amplifying the interrupted electrical signal.

2. The instrument of claim 1 in which the mechanical means comprises an electric motor and a rotating blade assembly driven by said electric motor, said blade assembly having at least one blade that moves periodically between said light transmitting element and said light sensing means to interrupt the light reaching the light sensing means.

3. The instrument of claim 1 in which said blade has a width at least equal to the active portion of said light transmitting element.

4. The instrument of claim 3 in which the transparent, electrically conductive coating is tin oxide.

5. In an instrument for measuring the chemiluminescence of a reaction taking place in a reaction chamber, a system for producing an electrical signal representing the chemiluminescence comprising
    a light transmitting element for transmitting the chemiluminescence produced in the reaction,
    a light sensing means for receiving the light transmitted through the light transmitting element and producing an electrical signal representative of the amount of light received,
    mechanical means moving between the light transmitting element and the light sensing means for interrupting periodically the light reaching the light sensing means, said light sensing means thus producing a periodically interrupted electrical signal having the characteristics of an alternating signal,
    a transparent, electrically conductive member positioned between said mechanical means and said light sensing means, said member being connected electrically to said mechanical means to isolate electrically the light sensing means from the mechanical means, and
    means for amplifying the interrupted electrical signal.

6. The instrument of claim 5 in which the transparent, electrically conductive member is a coating of tin oxide applied to the surface of the light sensing means.

7. In combination with an instrument for generating an alternating electrical output signal indicative of received electromagnetic radiation of the type having a radiation source, a radiation receiving transducer and a mechanical member moving intermediate the radiation source and the radiation receiving transducer, the improvement comprising
    means forming a radiation transparent, electrically conductive member intermediate the mechanical member and the transducer, and
    means electrically interconnecting said radiation transparent electrically conductive member and the mechanical member whereby the capacitive coupling of the moving mechanical member to the transducer and any spurious signals generated thereby will be minimized.

References Cited

UNITED STATES PATENTS

| | | | |
|---|---|---|---|
| 3,285,703 | 11/1966 | Narita et al. | 23—254 |
| 3,287,089 | 11/1966 | Wilburn | 23—254 |
| 3,299,274 | 1/1967 | Hoelter | 356—217 |
| 3,520,660 | 7/1970 | Webb | 23—253 |
| 3,584,961 | 6/1971 | Cason et al. | 356—217 |
| 3,612,866 | 10/1971 | Stevens | 23—254 X |
| 3,647,387 | 3/1972 | Benson et al. | 23—254 |

MORRIS O. WOLK, Primary Examiner

R. E. SERWIN, Assistant Examiner

U.S. Cl. X.R.

23—254 R, 254 E; 250—218; 356—217